United States Patent [19]

Brandstetter et al.

[11] 4,387,189
[45] Jun. 7, 1983

[54] THERMOPLASTIC MOLDING MATERIALS CONTAINING POLYMERS WITH POLYPHENYLENE ETHER GROUPS AND STYRENE POLYMERS

[75] Inventors: Franz Brandstetter, Neustadt; Juergen Hambrecht, Neckargemuend; Herbert Naarmann, Wattenheim; Hans Schuster, Ludwigshafen, all of Fed. Rep. of Germany

[73] Assignee: BASF Aktiengesellschaft, Fed. Rep. of Germany

[21] Appl. No.: 297,948

[22] Filed: Aug. 31, 1981

[30] Foreign Application Priority Data

Sep. 20, 1980 [DE] Fed. Rep. of Germany ....... 3035587

[51] Int. Cl.³ .......................... C08F 8/00; C08L 71/04
[52] U.S. Cl. ........................................ 525/68; 525/69; 525/132; 525/133; 525/392

[58] Field of Search ................... 525/68, 71, 133, 132, 525/69, 392

[56] References Cited

U.S. PATENT DOCUMENTS

| | | | |
|---|---|---|---|
| 3,375,228 | 3/1968 | Holoch et al. | 260/47 |
| 3,383,435 | 5/1968 | Cizek | 260/874 |
| 4,113,797 | 9/1978 | Lee, Jr. | 525/68 |
| 4,128,602 | 12/1978 | Katchman et al. | 260/876 R |
| 4,128,603 | 12/1978 | Katchman et al. | 260/876 R |
| 4,156,770 | 5/1979 | White | 528/213 |
| 4,156,773 | 5/1979 | Loucks et al. | 528/214 |
| 4,165,422 | 8/1979 | White | 525/215 |

*Primary Examiner*—J. Ziegler
*Attorney, Agent, or Firm*—Keil & Witherspoon

[57] ABSTRACT

Thermosplastic molding materials which contain styrene polymers and polyphenylene ethers whose phenolic hydroxyl groups have been reacted with reactive copolymers.

4 Claims, No Drawings

THERMOPLASTIC MOLDING MATERIALS CONTAINING POLYMERS WITH POLYPHENYLENE ETHER GROUPS AND STYRENE POLYMERS

The present invention relates to thermoplastic molding materials containing polymers with polyphenylene ether groups and styrene polymers.

Thermoplastic materials which are suitable for the production of moldings and which contain styrene polymers and polyphenylene ethers are disclosed in, for example, U.S. Pat. Nos. 3,383,435, 4,128,602 and 4,128,603. Such molding materials may be used for the production of moldings which have greater heat distortion resistance than those made from styrene polymers. It is also known that for improvement of quality of the polyphenylene ethers, the free phenolic hydroxyl groups of the latter must be blocked; this can be achieved, by, for example, etherification or esterification during the preparation or processing of the polyphenylene ethers (U.S. Pat. No. 3,375,228 and German Laid-Open Applications DOS Nos. 2,822,434, DOS 2,822,856 and DOS 2,822,857). Frequently it is desirable, in order to achieve certain properties of the material, to employ polyphenylene ethers of relatively high molecular weight in the molding materials. We have found that the lengthening of the reaction time involved in preparing polyphenylene ethers of relatively high molecular weight often results in undesirable branching and in the formation of undesirable by-products. This impairs the properties of the material.

It is an object of the present invention to provide thermoplastic molding materials, based on polymers containing polyphenylene ether groups, which do not suffer from the disadvantages of molding materials containing conventional polyphenylene ethers.

We have found that this object is achieved by providing thermoplastic molding materials which contain styrene polymers and polymers with polyphenylene ether groups, in which the phenolic hydroxyl end group has been reacted with reactive copolymers which contain anhydride, acid, acid chloride or ester groups.

The polyphenylene ethers which can be used in the molding materials are compounds based on polymers of orthodisubstituted phenylene oxide units, the ether oxygen of one unit being bonded to the benzene nucleus of the next unit, and at least 10 units being thus linked. The polyphenylene ethers can contain hydrogen, halogen, hydrocarbon radicals free from $\alpha$-tert. hydrogen, halohydrocarbon radicals, phenyl radicals and hydrocarbon-oxy radicals in the ortho-position to the oxygen. Accordingly, suitable materials are poly-(2,6-dichloro-1,4-phenylene)-ether, poly-(2,6-diphenyl-1,4-phenylene)-ether, poly-(2,6-dimethoxy-1,4-phenylene)-ether, poly-(2,6-dimethyl-1,4-phenylene)-ether and poly-(2,6-dibromo-1,4-phenylene)-ether. Of these, poly-(2,6-dimethyl-1,4-phenylene)-ether is preferred. The polyphenylene ethers can, for example, be prepared from the phenols in the presence of complexing agents such as copper bromide and sec.-butylamine.

It is a precondition that the polyphenylene ethers contain free phenolic hydroxyl end groups. The polyphenylene ethers have an intrinsic viscosity, measured in chloroform at 30° C., of not less than 0.01, and preferably from 0.2 to 0.4, dl/g.

The hydroxyl end groups of the polyphenylene ethers are reacted with copolymers which contain anhydride, acid chloride, acid or ester groups. These copolymers are multifunctional coupling agents, so that the reaction with the hydroxyl end groups of the polyphenylene ethers results in star-shaped or comb-shaped polymers which contain polyether groups. The copolymers contain, as copolymerized units, styrene and/or nuclear-alkylated or sidechain-alkylated styrenes and/or esters of acrylic acid or methacrylic acid with monoalcohols of 1 to 6 carbon atoms, and one or more comonomers having a reactive group, such as an anhydride, acid, acid chloride or ester group. Preferably, copolymers of from 90 to 30% of styrene with from 1 to 50% of maleic anhydride and/or acrylic and/or methacrylic acid or acid chloride are used in the molding materials. However, from 1 to 50% by weight of esters of acrylic acid or methacrylic acid with a monoalcohol of 1 to 6 carbon atoms as the comonomer with reactive groups can also be used. The copolymers can furthermore contain from 0 to 30% by weight of other olefinically unsaturated monomers which from copolymers with the above monomers. Examples of such other monomers are acrylonitrile, methacrylonitrile, N-vinylpyrrolidone, acrylamide, methacrylamide, acrolein and allyl alcohol. $\alpha$-Olefins, such as isobutylene, diisobutene and triisobutene may also be employed. The sum of the percentages of the various comonomers in the copolymer is 100. The structure of the copolymers should be such that they contain not less than 2, and preferably not less than 4, reactive groups per molecule. The molecular weights of the copolymers are in general from 500 to 20,000 (measured by osmometry on a 1–5% strength by weight solution in acetone). Preferably, the molecular weights are from 500 to 7,000, especially from 800 to 2,000. The preparation of these multifunctional copolymers is known and is preferably effected by free radical solution polymerization or mass polymerization of the monomers.

The reaction of the polyphenylene ethers, containing phenolic hydroxyl end groups, with the multifunctional styrene copolymers can be effected in the presence or absence of a solvent and/or in the presence of other styrene polymers suitable for use as a component of the molding materials. The reaction is in general carried out at from 250° to 350° C., preferably from 280° to 320° C. The reaction of the polyphenylene ethers with the multifunctional styrene copolymers is preferably carried out in the presence of the styrene polymer which is intended as a component of the molding material. Advantageously, the components are compounded in mixing equipment such as single-screw or twin-screw extruders or mills, such as are conventionally employed for mixing high molecular weight compounds.

For the purposes of the invention, thermoplastic molding materials are mixtures which can, by thermoplastic processing within certain temperature ranges, be converted to moldings or rods, tubes or sheets. The molding materials can be in the form of granules or powder, or be premolded by tableting, or be in the form of sheets or webs.

Particularly suitable thermoplastic molding materials contain from 5 to 90% by weight of a styrene polymer and from 95 to 10% by weight of the reaction product with polyphenylene ether groups. Preferred molding materials contain from 20 to 80% by weight of the former and from 80 to 20% by weight of the latter.

Amongst the styrene polymers which are present in the thermoplastic molding materials, polystyrene and high-impact polystyrene are particularly suitable. However, styrene copolymers with up to 30% by weight of other monomers, such as acrylonitrile or acrylic acid esters, can also be used.

The preparation of the high-impact polymers is carried out by conventional mass polymerization or solution polymerization methods, for example as described in U.S. Pat. No. 2,694,692, or by a mass suspension method, as described, for example, in U.S. Pat. No. 2,862,906.

Suitable monovinyl-aromatic compounds for this purpose are in particular styrene and nuclear-alkylated or sidechain-alkylated styrenes, eg. α-methylstyrene and vinyltoluene. The monovinyl-aromatic compounds can be employed individually or as mixtures with one another; preferably, however, styrene alone is used.

The rubbers used in the preparation of the high-impact polymers are the natural or synthetic rubbers conventionally employed for making styrene polymers impact- resistant, for example polybutadiene.

The preparation of the high-impact polymers is carried out by polymerizing the mono- vinyl-aromatic compounds in the presence of the rubber, as a rule in a conventional manner, such as by mass polymerization, solution polymerization or aqueous dispersion polymerization.

In solution polymerization, up to 50% by weight, based on monovinyl-aromatic compounds employed, of an inert diluent can be added to the monomers in order to prepare the starting solution.

In aqueous dispersion polymerization, as a rule no solvent is added; in a particularly advantageous embodiment, the solution of the rubber in the monomers is mass-prepolymerized to a conversion of about 30% under the action of shearing forces, after which the reaction mixture is suspended in water and the polymerization then taken to completion.

The mass polymerization or solution polymerization is as a rule carried out at from 50° to 250° C., preferably from 100° to 200° C. The polymerization batch must be thoroughly stirred, at least in the first stage of the polymerization, ie. up to conversions of the mono- vinyl-aromatic compounds of 45% by weight or less. All the above polymerization processes are adequately known and are described in detail in the literature. A summary is given by Amos, Polym. Engng. Sci., 14 (1974) No. 1, 1–11, and in U.S. Pat. Nos. 2,694,692 and 2,862,906, to which reference may be made for further details.

We have found that the molding materials according to the invention, containing polyphenylene ethers whose hydroxyl end groups have been reacted with the above-mentioned copolymers have advantageous properties compared to other molding materials containing polyphenylene ethers. For example, the novel molding materials have particularly high impact strength, together with good heat distortion resistance and good processability.

EXAMPLES

1. Preparation of the Reactive Multifunctional Copolymers

A mixture of monomers in one of the percent by weight compositions shown in the Table is fed continuously to a polymerization apparatus comprising a pressure kettle and a downstream pressure tube equipped with static mixing elements. The polymerization is carried out at 260° C. The copolymer is taken off at the reactor exit. The average residence time of the monomers in the polymerization zone is 15 minutes. The pressure in the polymerization zone is kept at 25 bar.

The remaining monomers are stripped from the polymer melt in a devolatilization apparatus under a pressure of 5–20 mm Hg and at from 150° to 200° C.

2. Reaction of the Copolymers with the Polyether and Preparation of the Thermoplastic Molding Materials.

The parts by weight of the multifunctional styrene copolymer and poly-(2,6-dimethyl-1,4-phenylene)-ether shown in the Table are thoroughly mixed in a fluid mixer with 0.8 part by weight of tris- (nonylphenyl) phosphite and 1.5 parts by weight of polyethylene. This mixture, together with the parts by weight of polystyrene shown in the Table, are melted, homogenized and then granulated on a twin-screw extruder operated at 280° C. Under these conditions, the polyether reacts with the copolymer.

Test specimens are prepared from these mixtures on an injection molding machine at 280° C. The breaking energy is determined according to DIN 53,443, page 1, at 23° C. The softening points are determined by the Vicat method according to DIN 53,460/B.

TABLE

| Example | Polystyrene [parts by weight] | Poly-(2,6-dimethyl-1,4-phenylene)-ether [parts by weight] | Intrinsic viscosity [dl/g] | Reactive copolymers | | | Fracturing work (Nm) | Vicat softening point [°C.] |
|---|---|---|---|---|---|---|---|---|
| | | | | Monomer composition [% by weight] | [parts by weight] | $M_n$ determined osmometrically | | |
| 1 | 75[1] | 23 | 0.43 | S (70) MA (30) | 2 | 1400 | 0.8 | 114 |
| 2 | 50[1] | 48 | 0.43 | S (70) MA (30) | 2 | 1400 | 1.1 | 137 |
| 3 | 30[1] | 68 | 0.43 | S (70) MA (30) | 2 | 1400 | 1.4 | 161 |
| 4 | 60[1] | 39 | 0.43 | S (60) AA (10) MA (30) | 1 | 1700 | 0.9 | 132 |
| 5 | 60[1] | 39 | 0.43 | MMA (70) AA (10) t-BA (20) | 1 | 1100 | 1.0 | 129 |
| 6 | 75[2] | 24 | 0.40 | S (60) MA (40) | 1 | 1200 | 11 | 116 |
| 7 | 50[2] | 49 | 0.40 | S (60) MA (40) | 1 | 1200 | 17 | 137 |
| 8 | 25[2] | 74 | 0.40 | S (60) MA (40) | 1 | 1200 | 14 | 160 |
| 9 | 75[2] | 24 | 0.40 | S (55) | 1 | 1300 | 12 | 116 |

TABLE-continued

| Example | Polystyrene [parts by weight] | Poly-(2,6-dimethyl-1,4-phenylene)-ether [parts by weight] | Intrinsic viscosity [dl/g] | Reactive copolymers Monomer composition [% by weight] | Reactive copolymers [parts by weight] | $M_n$ determined osmometrically | Fracturing work (Nm) | Vicat softening point [°C.] |
|---|---|---|---|---|---|---|---|---|
| 10 | 75[2] | 23 | 0.33 | AA (45) S (60) | 2 | 1700 | 9 | 113 |
| 11 | 75[2] | 23.75 | 0.40 | AA (5) MA (35) S (60) | 1.25 | 1700 | 11 | 117 |
| 12 | 75[2] | 24 | 0.43 | AA (5) MA (35) S (60) | 1 | 1700 | 11 | 118 |
| 13 | 75[2] | 24.5 | 0.43 | AA (5) MA (35) S (60) | 0.5 | 1700 | 10 | 115 |
| 14 | 75[2] | 24.75 | 0.43 | AA (5) MA (35) S (60) | 0.25 | 1700 | 9 | 116 |
| 15 | 60[2] | 39 | 0.43 | AA (14) MA (23,5) S (62,5) | 1 | 1400 | 13 | 135 |
| 16 | 75[2] | 24 | 0.43 | AA (10) MA (20) S (70) | 1 | 1900 | 11 | 117 |
| 17 | 60[2] | 39 | 0.43 | MMA (10) AA (10) MA (30) S (50) | 1 | 1400 | 14 | 134 |
| 18 | 30[2] | 69 | 0.43 | t-BA (35) S (65) | 1 | 1100 | 19 | 158 |
| 19 | 75[2] | 24 | 0.51 | MMA (45) AA (20) MA (35) | 1 | 1750 | 9 | 115 |
| 20 | 75[2] | 24 | 0.43 | MMA (55) t-BA (35) AA (10) | 1 | 1400 | 10 | 115 |
| 21 | 75[2] | 24 | 0.51 | MMA (50) AN (10) AA (5) MA (35) | 1 | 1550 | 11 | 116 |
| 22 | 75[2] | 24.5 | 0.51 | S (65) AN (15) NA (20) | 1 | 2100 | 10 | 117 |
| 23 | 75[2] | 24.5 | 0.33 | S (60) BA (10) AA (5) MA (25) | 1 | 1600 | 11 | 116 |
| 24 | 60[2] | 39 | 0.40 | S (70) AA-Cl (30) | 1 | 1100 | 12 | 135 |
| 25 | 75[2] | 24 | 0.43 | S (60) AN (10) AA-Cl (30) | 1 | 1450 | 10 | 114 |
| Comparative experiments (not according to the invention) | | | | | | | | |
| A | 75[2] | 25 | 0.43 | — | — | — | 0.2 | 118 |
| B | 60[2] | 40 | 0.43 | — | — | — | 0.2 | 133 |
| C | 75[2] | 25 | 0.43 | — | — | — | 4 | 105 |
| D | 60[2] | 40 | 0.43 | — | — | — | 7 | 130 |
| E | 30[2] | 70 | 0.43 | — | — | — | 12 | 158 |
| F | 75[2] | 25 | 0.33 | — | — | — | 2 | 103 |
| G | 75[2] | 25 | 0.40 | — | — | — | 3 | 105 |
| H | 75[2] | 25 | 0.51 | — | — | — | 5 | 106 |

[1] Standard polystyrene (molecular weight = 200,000)
[2] High-impact polystyrene containing 8 parts by weight of polybutadiene Abbreviations:
S = styrene
AA = acrylic acid
MA = maleic anhydride
MMA = methyl methacrylate
BA = n-butyl acrylate
t-BA = tert.-butyl acrylate
AN = acrylonitrile
AA-Cl = acrylic acid chloride

We claim:
1. A thermoplastic molding material containing a styrene polymer and a polyphenylene ether, wherein the polyphenylene ether is a polymer in which the phenolic hydroxyl end groups have been reacted with the anhydride groups of a copolymer of styrene and maleic anhydride, the molecular weight of which copolymer is from 500 to 7,000, measured by osmometry on a 1–5% strength by weight solution in acetone.

2. A thermoplastic molding material as defined in claim 1, wherein the styrene polymer is polystyrene.

3. A thermoplastic molding material as defined in claim 1, wherein the styrene polymer is high-impact polystyrene.

4. A thermoplastic molding material as defined in claim 1, wherein the molecular weight of the copolymer is from 800 to 2,000, measured by osmometry on a 1–5% strength by weight solution in acetone.

* * * * *